United States Patent
Phan et al.

(10) Patent No.: US 10,972,025 B2
(45) Date of Patent: *Apr. 6, 2021

(54) ENCODERLESS MOTOR WITH IMPROVED GRANULARITY AND METHODS OF USE

(71) Applicant: Cepheid, Sunnyvale, CA (US)

(72) Inventors: Tien Phan, Sunnyvale, CA (US); Doug Dority, Sunnyvale, CA (US)

(73) Assignee: Cepheid, Sunnyvale, CA (US)

( * ) Notice: Subject to any disclaimer, the term of this patent is extended or adjusted under 35 U.S.C. 154(b) by 188 days.

This patent is subject to a terminal disclaimer.

(21) Appl. No.: 16/375,044

(22) Filed: Apr. 4, 2019

(65) Prior Publication Data
US 2019/0334460 A1  Oct. 31, 2019

Related U.S. Application Data

(63) Continuation of application No. 15/217,893, filed on Jul. 22, 2016, now Pat. No. 10,348,225.
(Continued)

(51) Int. Cl.
*H02P 6/16* (2016.01)
*H02K 11/00* (2016.01)
(Continued)

(52) U.S. Cl.
CPC .......... *H02P 6/16* (2013.01); *H02K 1/27* (2013.01); *H02K 11/0094* (2013.01); *H02K 11/215* (2016.01); *H02K 15/02* (2013.01); *H02K 29/08* (2013.01); *H02K 1/2786* (2013.01); *H02K 21/22* (2013.01); *H02K 2211/03* (2013.01); *H02K 2213/03* (2013.01)

(58) Field of Classification Search
USPC ..................................... 318/400.38
See application file for complete search history.

(56) References Cited

U.S. PATENT DOCUMENTS 6,522,130 B1 * 2/2003 Lutz .................. G01B 7/30
                                                    310/68 B
7,391,207 B2   6/2008 Oohira
(Continued)

FOREIGN PATENT DOCUMENTS

CN      201860242 U    6/2011
CN    201320597522 U    9/2013
(Continued)

*Primary Examiner* — Jorge L Carrasquillo
(74) *Attorney, Agent, or Firm* — Kilpatrick Townsend & Stockton LLP

(57) ABSTRACT

A DC electric motor having a stator mounted to a substrate, the stator having a coil assembly having a magnetic core, a rotor mounted to the stator with permanent magnets distributed radially about the rotor, the permanent magnets extending beyond the magnetic core, and sensors mounted to the substrate adjacent the permanent magnets. During operation of the motor passage of the permanent magnets over the sensors produces a substantially sinusoidal signal of varying voltage substantially without noise and/or saturation, allowing an angular position of the rotor relative the substrate to be determined from linear portions of the sinusoidal signal without requiring use of an encoder or position sensors and without requiring noise-reduction or filtering of the signal.

25 Claims, 11 Drawing Sheets

Related U.S. Application Data

(60) Provisional application No. 62/195,449, filed on Jul. 22, 2015.

(51) Int. Cl.
  *H02K 15/02* (2006.01)
  *H02K 11/215* (2016.01)
  *H02K 29/08* (2006.01)
  *H02K 1/27* (2006.01)
  *H02K 21/22* (2006.01)

(56) References Cited

U.S. PATENT DOCUMENTS

| | | | |
|---|---|---|---|
| 2003/0057781 A1* | 3/2003 | Shukuri | F04D 23/008 |
| | | | 310/68 B |
| 2006/0006747 A1* | 1/2006 | Kadowaki | H02K 29/14 |
| | | | 310/68 B |
| 2006/0016427 A1 | 1/2006 | Uda | |
| 2007/0176568 A1 | 8/2007 | Robichaux | |
| 2009/0292501 A1* | 11/2009 | Bernard | H02P 23/14 |
| | | | 702/151 |
| 2009/0315493 A1* | 12/2009 | Hsu | H02P 6/22 |
| | | | 318/400.09 |
| 2015/0295525 A1 | 10/2015 | Liu | |

FOREIGN PATENT DOCUMENTS

| | | | |
|---|---|---|---|
| JP | 04208090 A | * | 7/1992 |
| JP | 04208090 A | | 7/1992 |
| JP | 09056191 A | | 2/1997 |
| JP | 2002-165480 A | | 6/2002 |
| JP | 2002-369576 A | | 12/2002 |
| JP | 2006/025537 A | | 1/2006 |
| JP | 2007/502014 A | | 2/2007 |
| JP | 2009/297166 A | | 12/2009 |
| JP | 2010/054230 A | | 3/2010 |
| JP | 2010/162347 A | | 7/2010 |
| JP | 2010/213435 A | | 9/2010 |
| JP | 2011/199968 A | | 10/2011 |
| JP | 2012/130101 A | | 7/2012 |
| WO | 2005/034175 A2 | | 4/2005 |

* cited by examiner

ENCODERLESS MOTOR WITH IMPROVED GRANULARITY AND METHODS OF USE

CROSS-REFERENCES TO RELATED APPLICATIONS

This application is a Continuation of U.S. application Ser. No. 15/217,893, filed Jul. 22, 2016, which claims the benefit of priority of U.S. Provisional Application No. 62/195,449 entitled "Simple Centroid Implementation of Commutation and Encoding for DC Motor" filed on Jul. 22, 2015 the entire contents of which are incorporated herein by reference.

This application is generally related to U.S. patent application Ser. No. 15/217,920, filed Jul. 22, 2016, entitled "Molecular Diagnostic Assay System" filed concurrently herewith; U.S. patent application Ser. No. 13/843,739 entitled "Honeycomb tube," filed on Mar. 15, 2013; U.S. Pat. No. 8,048,386 entitled "Fluid Processing and Control," filed Feb. 25, 2002; U.S. Pat. No. 6,374,684 entitled "Fluid Control and Processing System," filed Aug. 25, 2000; each of which is incorporated herein by reference in its entirety for all purposes.

FIELD OF THE INVENTION

The present invention relates to the field of electric motors, in particular brushless DC electric motors, and pertains to commutation and encoding for such motors.

BACKGROUND OF THE INVENTION

Commutation for brushless DC (BLDC) electric motors can employ Hall-effect sensors to sense movement of permanent magnets in operation of the motors. Hall-effect sensors, however, have not been successfully incorporated to encode DC motors to a high degree of accuracy and to a high degree of granularity without the use of additional position sensors and/or encoder hardware, and as such their usefulness in this context is limited. In many instances, the successful operations and application, a of motor-driven elements requires a high degree of precision and resolution in determining the position (and changes in position) of the motor-driven elements. This can be particularly important for small scale devices. One such application is in driving pumps and syringes to manipulate fluid samples in analytic processes, for example, diagnostic procedures.

There is a need, therefore, for systems and methods that allow displacement of a motor, for example, encoding of a BLDC motor, at a very high degree of resolution and positional accuracy. It is further desirable to do so with relatively simple hardware and software.

BRIEF SUMMARY OF THE INVENTION

In one aspect, the invention provides system and methods for encoding a brushless DC electric motor in a manner that produces extraordinarily high resolution and positional accuracy without requiring use of any additional encoder hardware as taught herein. The same system and methods can also provide for commutation of the motor. In some embodiments, the system allows for encoding of a brushless DC motor without use of a hardware encoder or positional sensors and without requiring any noise-filtering of a measured voltage signal.

In some embodiments, the invention provides a motor system that includes a stator comprising a magnetic core, a rotor that is rotatably mounted relative to the stator and having a plurality of permanent magnets distributed radially about the rotor, and one or more voltage sensors at fixed positions relative the stator and disposed adjacent a path of the plurality of magnets during rotation of the rotor. The system further includes a processor module communicatively coupled with the one or more sensors and configured to determine a displacement of the motor from a voltage signal from the one or more sensors without requiring use of a hardware encoder or position-based sensor and/or without noise-reduction or filtering of the signal. In some embodiments, the plurality of magnets extend a distance (e.g. about 1 mm or greater) beyond the magnetic core of the stator such that the signal from the sensors is substantially without noise.

In some embodiments, the system includes a processing module configured to: receive a measured voltage signal from each of the one or more sensors during rotation of the rotor, the signal being a substantially sinusoidal signal of varying voltage during rotation of the rotor; and determine a displacement of the motor from linear portions of the sinusoidal signal. In some embodiments, the one or more sensors includes at least two sensors distributed along a path of the plurality of magnets such that the linear portions of the sinusoidal signals from adjacent sensors of the at least two sensors intersect so as to provide increased resolution and granularity of the combined linear portions of the signals for determination of motor displacement.

In some embodiments, the system includes a DC electric motor having a stator mounted to a substrate and a rotor mounted to the stator. The stator includes a coil assembly having a core and electrical windings, the coil assembly having an outside diameter, a proximal extremity, and a distal extremity. The rotor includes permanent magnets disposed along an outer edge (e.g. mounted to a cylindrical skirt), the rotor having an outside diameter, an inside diameter, and a distal edge. In some embodiments, the permanent magnets extend beyond the distal extremity of the magnetic core of the stator (i.e. the coil assembly). The system further includes one or more sensors mounted to the substrate adjacent the permanent magnets. In some embodiments, the rotor is fabricated using a series of separate permanent magnets arranged in a pattern of alternating opposite polarity of the adjacent magnets at the distal edge of the skirt. In some embodiments, the rotor is defined as a single piece of magnetic material (e.g. a ferromagnetic or ferrimagnetic material) in the shape of a strip, a ring or a disk, that is then magnetized to create the pattern of alternating opposite magnetic polarity at the distal edge of the skirt. Both fabrication methods are suitable for use with the invention. In some embodiments, the core, which is a core of magnetic material, typically a metal or other paramagnetic material. Non-limiting exemplary materials suitable for use in the core of the instant invention include iron, especially soft iron, cobalt, nickel, silicon, laminated silicon steel, silicon alloys, special alloys (e.g. mu-metal, permalloy, supermalloy, sendust), and amorphous metals (e.g. metglas). The core may also include air, and in some embodiments, the core is an air core. During operation of the motor, passage of the permanent magnets over the one or more sensors produces a substantially sinusoidal signal of varying voltage substantially without noise and/or saturation, thereby allowing an angular position of the rotor relative the substrate to be determined from linear portions of the sinusoidal signal without requiring use of encoder hardware or positional sensors. Thus, displacement of the motor can be determined and controlled with a high degree of accuracy and resolution. For example, a motor as described herein comprising 12 permanent magnets and 9 poles and using 3 Halls sensors and an 11-bit analog to digital converter as a processing module can deliver a resolution of about 0.01 degrees mechanical rotation, without use of any encoder hardware or positional sensors or noise filtering. The resolution and accuracy of the system can be increased or decreased by changing the number of poles, the number of permanent magnets, or using a higher or lower bit ADC.

In some embodiments, the one or more sensors mounted to the substrate are positioned relative to the extended edge of the permanent magnets. The position is defined such that a clearance from the extended edge of the permanent magnets to the one or more sensors is sufficient to provide a DC voltage signal substantially without noise and/or saturation. In some embodiments, the edge of the permanent magnets extends beyond the distal extremity of the coil assembly by about 100 microns. In some embodiments, the permanent magnets extend beyond the distal extremity of the coil assembly by less than 100 microns, e.g., 90, 80, 70, 60, 50, 40, 30, 20, 10 microns or less, depending on the particular embodiments of the motor. In some embodiments, the permanent magnets extend beyond the distal extremity of the coil assembly by more than 100 microns, for example, 200, 300, 400, 500, 600, 700, 800, 900, 1000 microns, including all values between about 100 microns and 1000 microns, or more depending on the particular embodiments of the motor. In some embodiments, the permanent magnets extend beyond the distal extremity of the coil assembly by about 1 mm or more, including but not limited to about 1 mm, 2 mm, 3 mm, 4 mm, 5 mm, 6 mm, 7 mm, 8 mm, 9 mm, 10 mm, or more. The exact distance that the permanent magnet extends beyond the distal extremity of the coil assembly depends on the particular characteristics and embodiments of the motor, and is well within the skill of an ordinary artisan to determine based on the guidance provided herein. In some embodiments, the one or more sensors are linear Hall-effect sensors, spaced apart by a common arc length along an arcuate path of the rotor.

In some embodiments, the motor includes an even number of permanent magnets evenly spaced around the cylindrical skirt with adjacent magnets exhibiting opposite polarity at the distal edge of the skirt, and at least two analog voltage sensors, (typically Hall-effect sensors) each sensor producing a voltage varying in a substantially sinusoidal pattern. In some embodiments, the motor includes two or more analog sensors, and in some embodiments the number of analog sensors is equal to the phase of the motor. For example, a three-phase motor can be controlled as described herein by use of three analog sensors. In some embodiments, the motor includes only one analog sensor, regardless of the phase of the motor. In some embodiments where a three-phase motor is provided, three Hall-effect sensors are used, each producing a voltage varying in a substantially sinusoidal pattern, the three patterns phase-shifted by about 120 degrees when the motor is in operation. In some embodiments, additional sensors can be used, as long as the minimum number of sensors is equal to the phase of the motor. The exact number of magnets can vary as long as it is an even number of magnets. For example, in some embodiments, there are twelve magnets and three linear Hall-effect sensors spaced at increments of forty degrees of mechanical rotation. In some embodiments, intersections of adjacent sinusoidal patterns define linear portions of the patterns.

In some embodiments, the device is configured with PCB including circuitry enabling analog-to-digital conversion (ADC) of voltage values in the defined linear portions of the patterns, and zero-crossing detection of the analog voltage patterns. In some embodiments, the circuitry employs an 11-bit analog to digital converter (ADC), producing 2048 equally-spaced digital values for each linear portion of the patterns. These equally spaced digital values for the linear portions of the patterns represent the resolution of the system. It is appreciated that higher or lower resolution can be achieved by using ADCs with a higher or lower number of bits, depending on the desired functionality for the particular motor. In some embodiments, the circuitry is implemented in a programmable system on a chip (PSOC). It is further appreciated that non-PSOC chips, e.g., field programmable gate arrays (FPGA) and the like can be used for implementing the circuitry.

In some embodiments, methods are provided for encoding a DC electric motor with a high degree of granularity without requiring use of an additional hardware encoder or position-based sensors and/or noise-filtering of an analog signal used to control displacement of the motor. Such methods can include: mounting a stator to a substrate, the stator having a coil assembly, having a core and electrical windings, the coil assembly having an outside diameter, a proximal extremity, and a distal extremity, mounting a rotor to the stator, the rotor having permanent magnets mounted to an outer periphery which extend in a particular direction beyond the distal extremity of the core (e.g. typically transverse to the plane along which the rotor rotates). The method further includes operating the DC electric motor by commutation, causing the permanent magnets to pass over the one or more sensors positioned on the substrate adjacent the permanent magnets. This operation produces one or more sinusoidal patterns of varying voltage substantially without noise or saturation, such that noise-filtering of the analog signal is not required. The method further entails determining positions of the rotor based on linear portions of the sinusoidal patterns.

In some embodiments, the one or more sensors mounted to the substrate are positioned relative to the extended edge of the permanent magnets of the rotor, with a clearance from the extended edge to the one or more sensors sufficient to provide a DC voltage without noise and/or saturation. In some embodiments, the voltage is from about 2 to about 5 volts DC. In some embodiments, the extended edge of the permanent magnets extends beyond the distal extremity of the coil assembly by about 1 mm or more. In some embodiments, the one or more sensors are linear Hall-effect sensors. In some embodiments, the sensors are spaced apart by a common arc length along an arcuate path of the rotor. In some embodiments there is an even number of permanent magnets evenly spaced around the cylindrical skirt with adjacent magnets exhibiting opposite polarity at the distal edge of the skirt, and three Hall-effect sensors, each Hall-effect sensor producing a voltage varying in a substantially sinusoidal pattern, the three patterns phase-shifted by about 120 degrees.

In some embodiments, there are twelve magnets and three linear Hall-effect sensors spaced at increments of about twenty degrees of mechanical rotation. In some embodiments the sensors are spaced apart from each other by a consistent radial distance, such as any radial distance between 0 degrees and 90 degrees (e.g. about 20 degrees, about 40 degrees, or about 60 degrees of mechanical rotation). In some embodiments, intersections of adjacent sinusoidal patterns define linear portions of the patterns, the linear portions being substantially without noise. In some embodiments, the substrate is a printed circuit board (PCB) including circuitry configured to enable analog-to-digital conversion (ADC) of voltage values in the defined linear portions of the patterns, and zero-crossing detection of the analog voltage patterns. In some embodiments, the circuitry employs an 11-bit analog to digital converter, producing 2048 equally-spaced digital values for each linear portion of the patterns. In some embodiments the circuitry is implemented in a programmable system on a chip (PSOC).

DETAILED DESCRIPTION OF THE INVENTION

Figure 1:
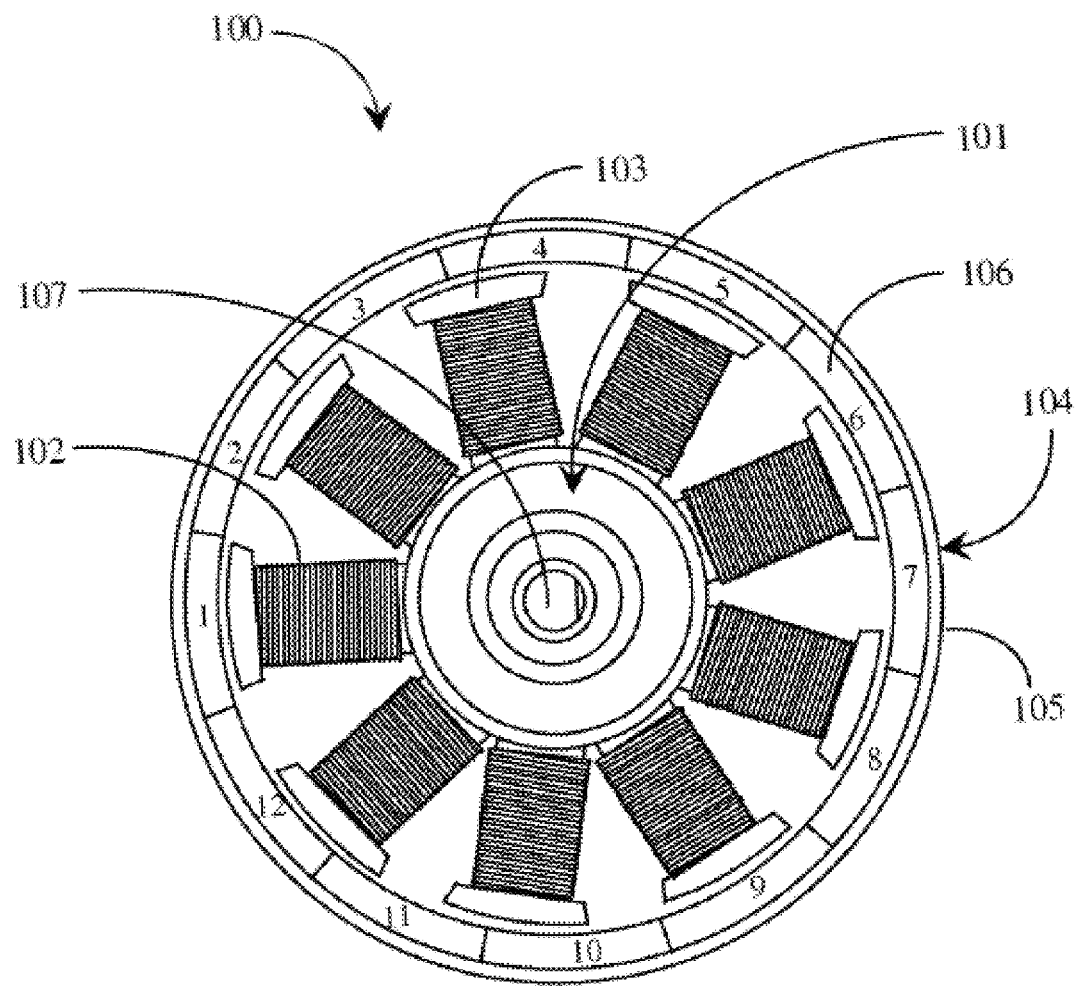
FIG. 1 is a plan view diagram illustrating elements of a brushless DC electric motor in an exemplary embodiment of the present invention.

FIG. 1 is a plan view diagram illustrating elements of a brushless DC (BLDC) electric motor 100 in a non-limiting exemplary prototype. It is appreciated that such a motor could be used in a wide variety of applications, and is of particular use for operation of a small-scale mechanical mechanism requiring a high level of accuracy and granularity. Some embodiments include a motor system having improved resolution in the determination of motor displacement without use of hardware encoders and/or noise-filtering, for example, a resolution of about 0.1 degrees of mechanical rotation, or preferably about 0.01 degrees mechanical rotation, or even about 0.001 degrees of mechanical rotation or less. One such application is operation of a syringe drive to effect highly precise fluid metering, or operation of a valve assembly of a diagnostic assay system that interfaces with a sample cartridge in order to facilitate a complex sample processing and/or analysis procedure upon fine-tuned movement of the valve assembly. Examples of such applications can be found in U.S. patent application Ser. No. 15/217,920 entitled "Molecular Diagnostic Assay System" filed concurrently herewith and U.S. Pat. No. 8,048,386 entitled "Fluid Processing and Control," filed Feb. 25, 2002; U.S. Pat. No. 6,374,684 entitled "Fluid Control and Processing System," filed Aug. 25, 2000, the entire contents of which are incorporate herein by reference.

In one aspect, the BLDC includes a rotor, a stator, and a plurality of analog voltage sensors configured to produce a smoothly varying Hall-effect voltage without any need for filtering or noise reduction. In some embodiments, this feature is provided by use of permanent magnets within the rotor that extend a distance beyond the magnetic core of the stator. In some embodiments, the BLDC includes as many analog voltage sensors as phases of the motor, which are positioned such that the motor can be controlled based on substantially only the linear portion of the measured voltage patterns received from the sensors. In some embodiments, this includes spacing the sensors radially about the stator such that the linear portions of the measured voltage waveforms intersect. For example, a three-phase BLDC can include three Hall-effect sensors spaced 40 degrees radially from each other, thereby allowing the system to control a position of the sensor within an increment of 40 degrees.

In the foregoing specification, the invention is described with reference to specific embodiments thereof, but those skilled in the art will recognize that the invention is not limited thereto. As used throughout, the term "about" can refer to the ±10% of the recited value. Various features and aspects of the above-described invention can be used individually or jointly. It is appreciated that any of the aspects or features of the embodiments described herein could be modified, combined or incorporated into any of the embodiments described herein, as well as in various other types and configurations. Further, the invention can be utilized in any number of environments and applications beyond those described herein without departing from the broader spirit and scope of the specification. The specification and drawings are, accordingly, to be regarded as illustrative rather than restrictive.

In some embodiments, such as that shown in FIG. 1, the motor includes an internal stator assembly 101 having nine pole teeth extending radially from center, each pole tooth ending in a pole shoe 103, and each pole tooth having a winding providing an electromagnetic coil 102. The motor further includes an external rotor 104 having an external cylindrical skirt 105 and twelve permanent magnets 106 arranged with alternating polarity around the inner periphery of the skirt 105. The permanent magnets are shaped to provide a cylindrical inner surface for the rotor with close proximity to outer curved surfaces of the pole shoes. The BLDC motor in this example is a three-phase, twelve pole motor. Controls provided, but not shown in FIG. 1, switch current in the coils 102 providing electromagnetic interaction with permanent magnets 106 to drive the rotor, as would be known to one of skill in the art. While an internal stator and external rotor are described here, it is appreciated that this approach can also be used in a motor having an internal rotor and external stator as well.

It should be noted that the number of pole teeth and poles, and indeed the disclosure of an internal stator and an external rotor are exemplary, and not limiting in the invention, which is operable with motors of a variety of different designs.

Figure 2A:
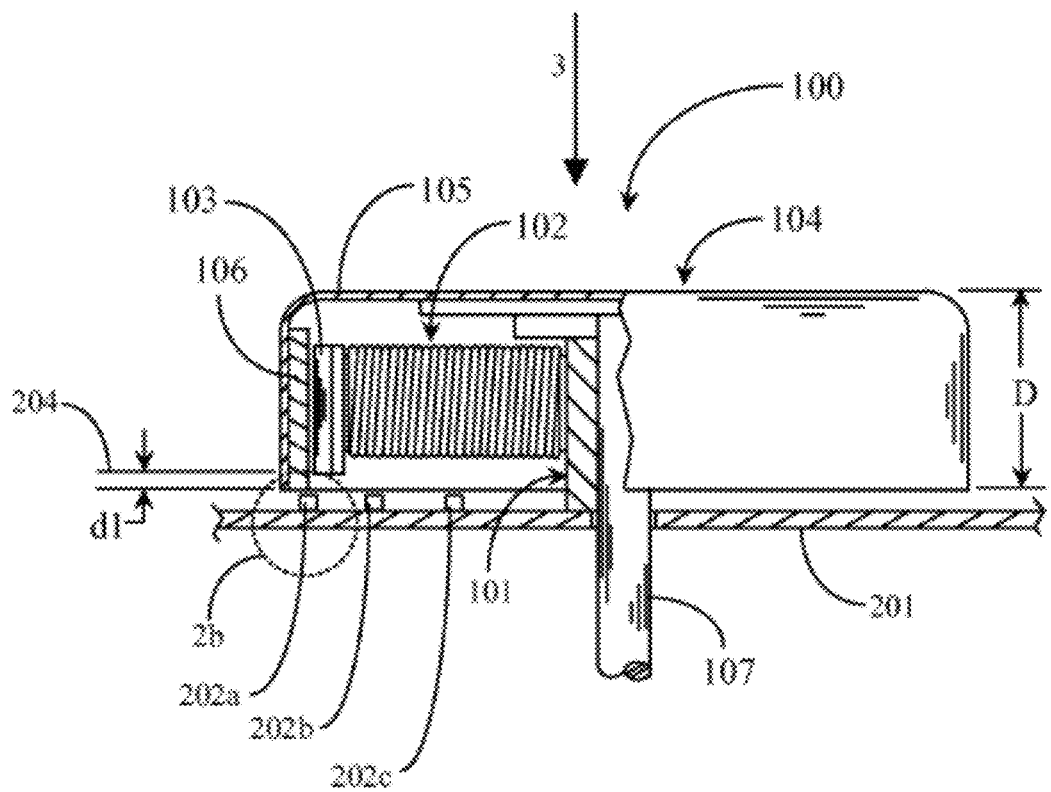
FIG. 2A is a side elevation view, partly in section, of the motor depicted in FIG. 1, mounted on a substrate.

FIG. 2A is a side elevation view, partly in section, of the motor of FIG. 1, cut away to show one pole tooth and coil of the nine, ending in pole shoe 103 in close proximity to one of the twelve permanent magnets 106 arranged around the inner periphery of cylindrical skirt 105 of external rotor 104. The pole teeth and pole shoes of stator assembly 101 are a part of the core, and define a distal extremity of the core at the height of line 204. Stator assembly 101 is supported in this implementation on a substrate 201, which in some embodiments is a printed circuit board (PCB), which can include a control unit and traces configured for managing switching of electrical current to coils 102 so as to provide electromagnetic fields interacting with the fields of permanent magnets 106 to drive the rotor. The PCB substrate can also include control circuitry for encoding and commutation. Rotor 104 engages physically with stator 101 by drive shaft 107, which engages a bearing assembly in the stator to guide the rotor with precision in rotation. Details of bearings are not shown in FIG. 2A, although it is appreciated that there are many conventional ways such bearings can be implemented. Drive shaft 107 in this implementation passes through an opening for the purpose in PCB 107 and can be engaged to drive mechanical devices.

Three linear Hall-effect sensors 202a, 202b and 202c are illustrated in FIG. 2A, supported by PCB 201, and positioned strategically according to some embodiments so as to produce variable voltage signals that may be used in a process to encode and provide commutation for motor 100. In FIG. 2A the overall height of skirt 105 of rotor 104 is represented by dimension D. Dimension d1 represents extension of the distal extremity of the rotor magnets below the distal extremity of the magnetic core at line 204. In some embodiments, the direction of this extension is transverse, typically perpendicular, to the plane along which the rotor rotates.

Figure 2B:
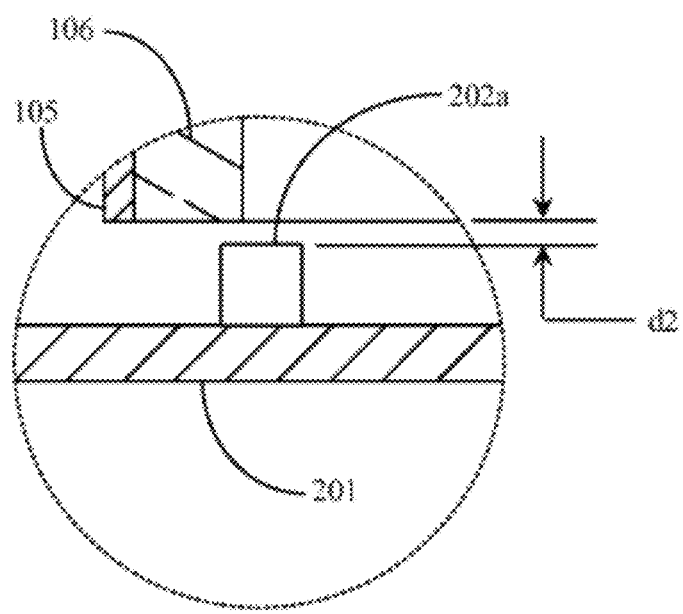
FIG. 2B is a magnified elevation view of area 2b of FIG. 2A, illustrating spacing between magnets and sensors in an exemplary embodiment of the invention.

FIG. 2B is a magnified elevation view of area 2b of FIG. 2A illustrating clearance d2 between the distal edge of the permanent magnets of rotor 104 and the structural bodies of the Hall-effect sensors 202a, 202b and 202c on PCB 201.

Figure 3A:
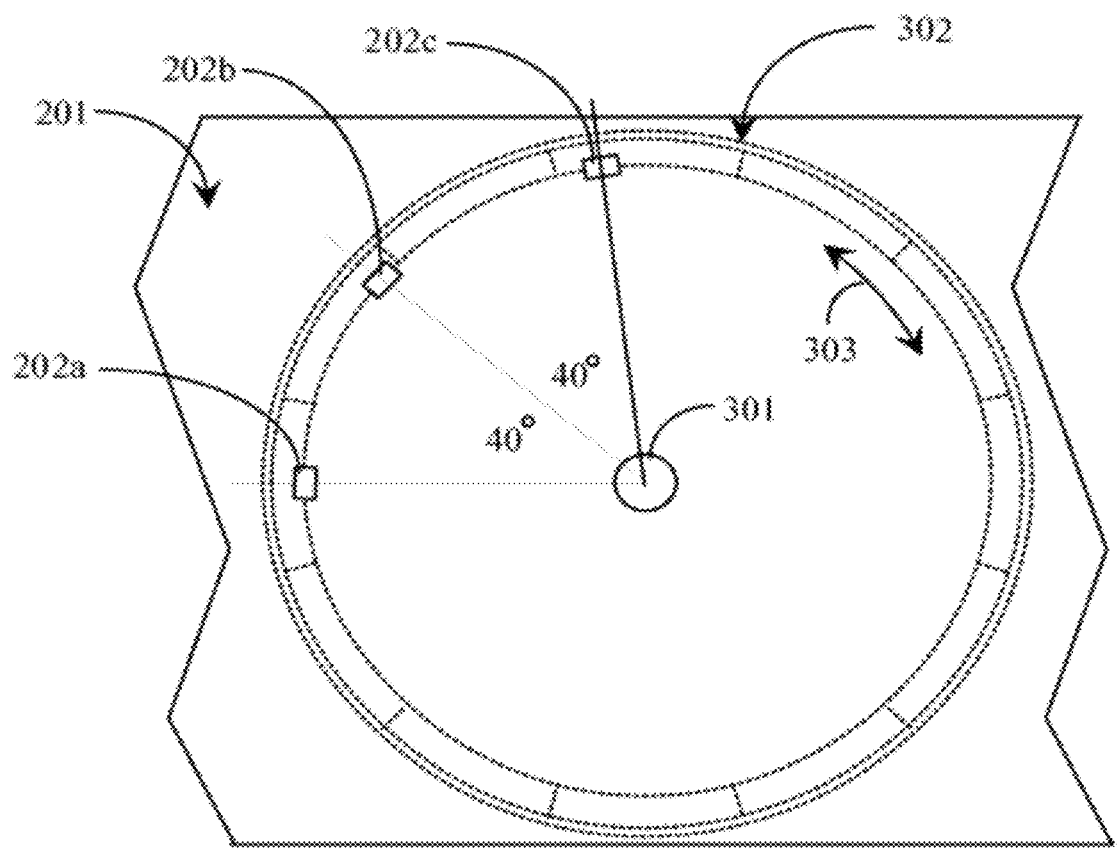
FIG. 3A is a plan view of the substrate (201) of FIG. 2B with the motor removed, illustrating placement of sensors in an exemplary embodiment of the invention.

FIG. 3A is a plan diagram of a portion of PCB 201 taken in the direction of arrow 3 of FIG. 2A, showing placement of Hall-effect sensors 202a, 202b and 202c relative to the distal edge of rotor 104, which may be seen in FIG. 2 to extend below the distal edge of the core by dimension d. In FIG. 3 the rotation track of rotor 104 including the twelve permanent magnets 106 is shown in dotted outline 302. The rotor rotates in either direction 303 depending on details of commutation. It is appreciated that the approaches described herein can be used regardless of the direction of rotation of the rotor.

As illustrated in this non-limiting exemplary prototype, each of Hall-effect sensors 202a, 202b and 202c is positioned beneath the distal edge of the rotor magnets, just toward the inside, radially, of the central track of the rotating magnets. Hall-effect sensor 202b is located to be forty degrees arc from Hall-effect sensor 202a along the rotating track of the magnets of the rotor. Similarly, Hall-effect sensor 202c is located a further forty degrees around the rotor track from Hall-effect sensor 202b.

Figure 3B:
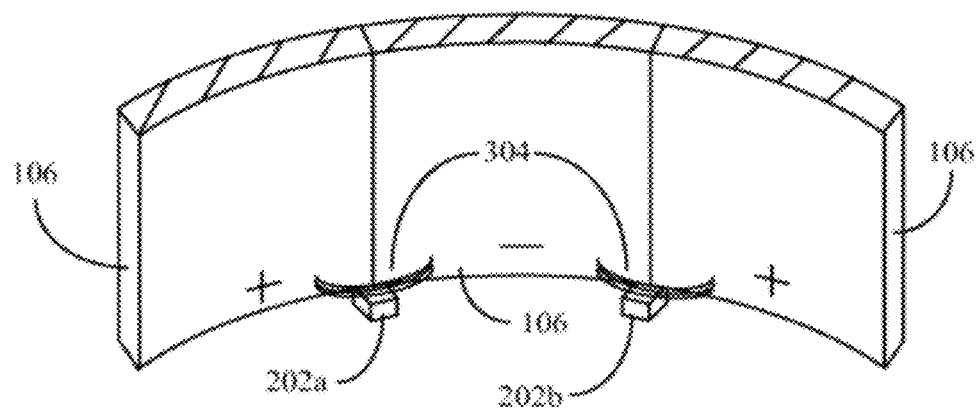
FIG. 3B illustrates the placement of the permanent magnets in the rotor in a pattern of alternating polarity at the distal edge, and showing the fringing fields of the adjacent permanent magnets according to an exemplary embodiment of the invention.

FIG. 3B is a perspective view of three of the permanent magnets 106 in relation to two of the Hall-effect sensors 202a and 202b in this non-limiting exemplary prototype.

The permanent magnets in the rotor are placed with alternating polarity as shown in FIG. 3B, and at the distal edge of the rotor fringing fields 304 are exhibited between adjacent permanent magnets. It is these fringing fields between adjacent permanent magnets that the analog sensors (e.g. Hall-effect sensors) are placed and spaced to sense the fringing fields, and the curved aspect of the inner surfaces of the permanent magnets dictate the placement of the Hall-effect sensors somewhat to the inside, radially, of the central track of the magnets in rotation. The Hall-effect sensors can be placed inside by a small distance, such as 1 mm or more (e.g. 2, 3, 4 mm) depending on the overall size of the device and the strength of the magnetic fields being dictated. It is advantageous for the space between the sensors and the permanent magnets (i.e. d2) to be minimized in order to substantially eliminate noise in the detection signal.

Referring back to FIG. 2A, dimension d1 refers to an extension distance of the distal extremity of the rotor magnets below the distal extremity of the core at line 204. In conventional motors, there is no reason or motivation to extend this edge below the extremity of the core, particularly since this can increase the height of the motor and require increased clearance between the rotor and substrate. In fact, the skilled artisan would limit dimension D so there is no such extension, as the added dimension would only add unnecessary cost and bulk to a conventional motor. Furthermore, in conventional motors at the distal extremity of the rotor, at the height of or above the distal extremity of the core, switching of current in coils 102 creates a considerable field effect, and a signal from a Hall-effect sensor placed to sense permanent magnets at that position would not produce a smoothly varying Hall-effect voltage. Rather, the effect in a conventional motor is substantially noise corrupted. The conventional approach to this dilemma is to introduce noise-filtering, or more commonly to utilize an encoder.

Advantageously, extending the rotor magnets below the distal extremity of the iron core avoids the corrupting effect of the switching fields from the coils of the stator on the signal from the Hall-effect sensors. The particular extension d1 will depend on several factors specific to the particular motor arrangement, and in some embodiments will be 1 mm or more (e.g. 2 mm, 3 mm, 4 mm, 5 mm, 6 mm, or greater), while in some other embodiments the extension will be less than 1 mm. In some embodiments, the distance is a function of the size of the permanent magnets and/or the strength of the magnetic field. In some embodiments of the exemplary prototype as detailed herein, 1 mm of extension is sufficient to produce a sinusoidal signal of varying voltage without noise or saturation. Placement of the Hall-effect sensors at a separation d2 to produce a Hall-effect voltage produces a smoothly variable voltage, devoid of noise. In some embodiments, the Hall-effect sensors produce a smoothly variable DC voltage in the range from about 2 volts to about 5 volts devoid of noise or saturation. The dimension d2 may vary depending on choice of sensor, design of a rotor, strength of permanent magnets in the rotor, and other factors that are well known to persons of skill in the art. A workable separation is readily discovered for any particular circumstance, to avoid saturation of the sensor and to produce a smoothly variable DC voltage substantially devoid of noise.

Figure 4:
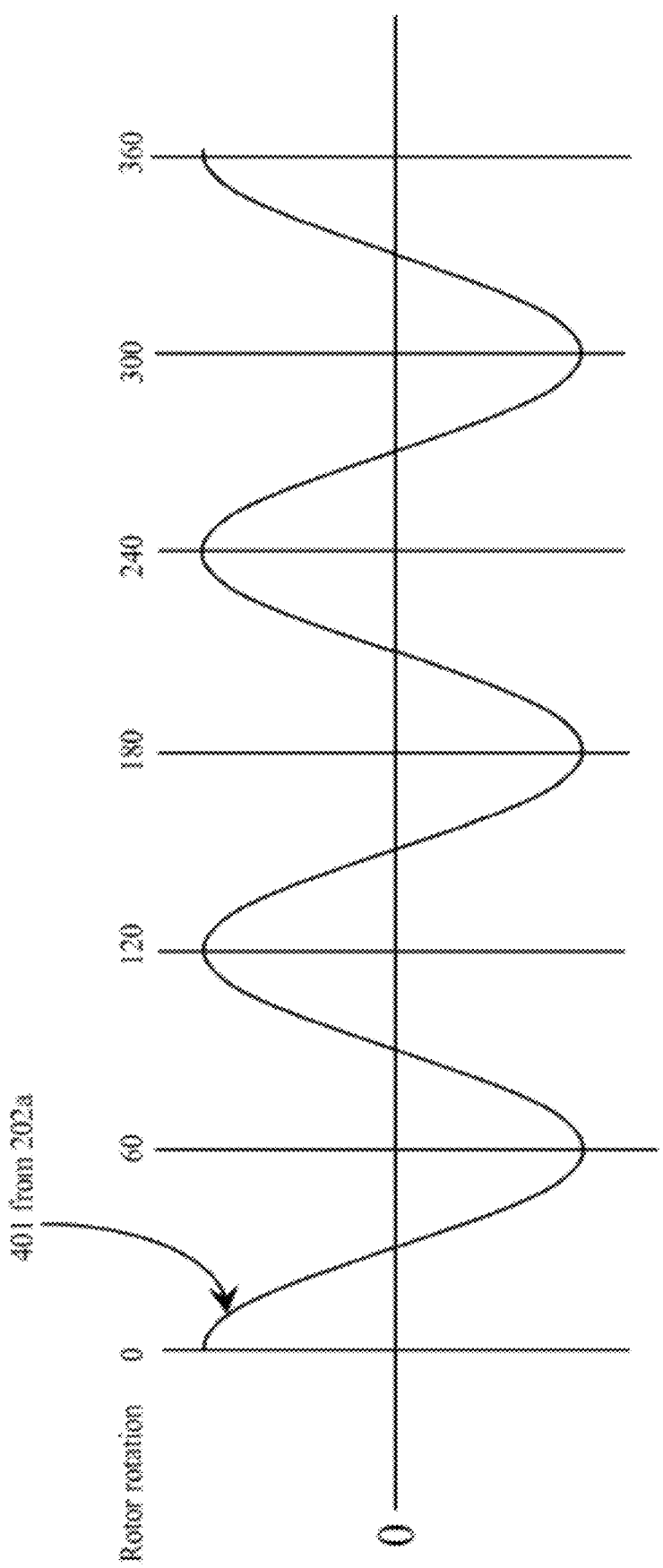
FIG. 4 illustrates an essentially sinusoidal variable voltage pattern produced by passage of permanent magnets of a motor rotor over a first Hall-effect sensor in an exemplary embodiment of the invention.

FIG. 4 illustrates a sinusoidal variable voltage pattern 401 produced by passage of permanent magnets 106 of rotor 104 over Hall-effect sensor 202a in a three-phase BLDC motor. The 0 degree starting point is arbitrarily set to be at a maximum voltage point. Three complete sine waveforms are produced in one full 360 degree revolution of the rotor.

Figure 5:
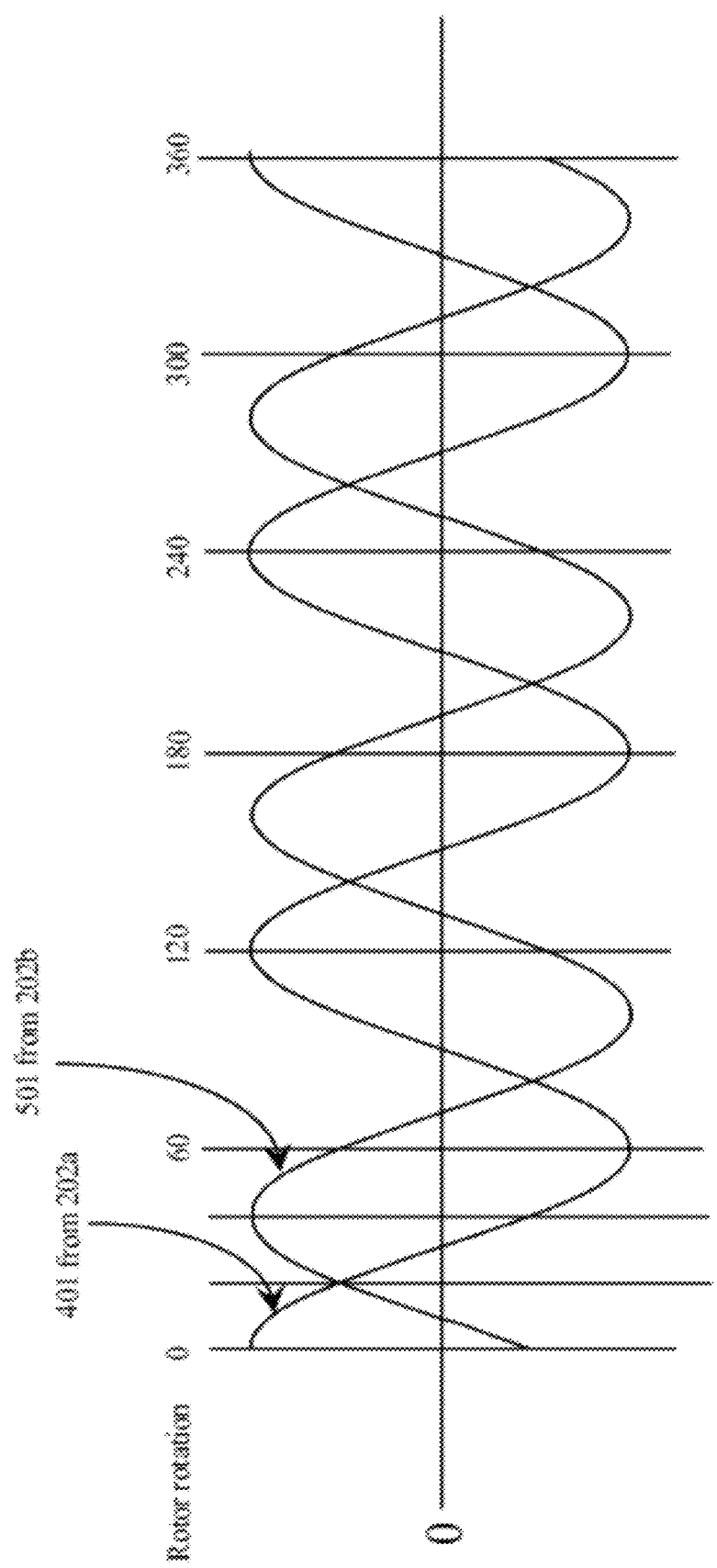
FIG. 5 illustrates a sinusoidal variable voltage pattern produced by passage of permanent magnets of a rotor over a second Hall-effect sensor, the pattern superimposed over the pattern of FIG. 4.

FIG. 5 illustrates a substantially noise free sinusoidal variable voltage pattern 501 produced by passage of permanent magnets 106 of rotor 104 over Hall-effect sensor 202b, with the 501 pattern superimposed over the 401 pattern of FIG. 4. As Hall-effect sensor 202b is positioned at an arc length of 40 degrees from the position of Hall-effect sensor 202a, sinusoidal pattern 501 is phase-shifted by 120 degrees from that of sinusoidal pattern 401.

Figure 6:
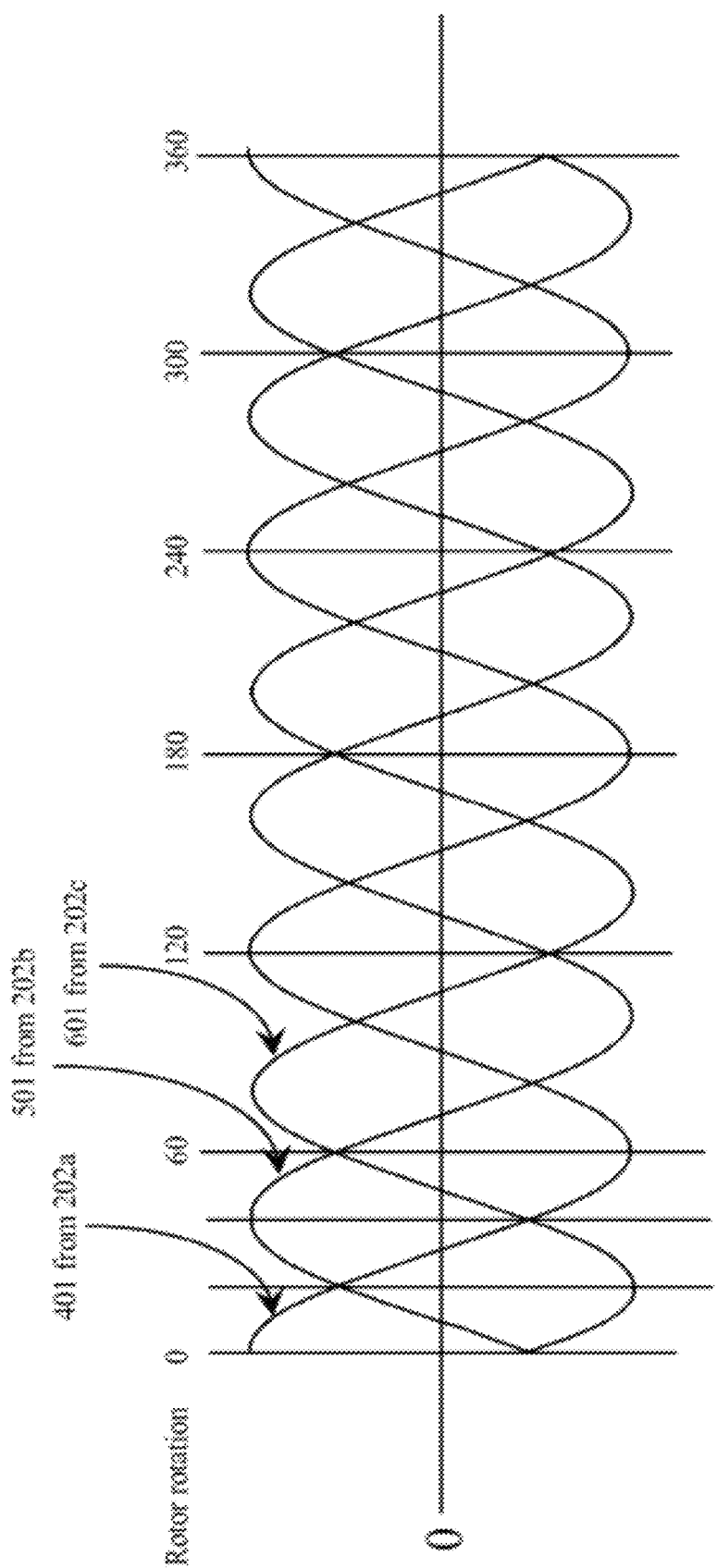
FIG. 6 illustrates a sinusoidal variable voltage pattern produced by passage of permanent magnets of a rotor over a third Hall-effect sensor, with the pattern superimposed over the patterns of FIG. 5.

FIG. 6 illustrates a substantially noise free sinusoidal variable voltage pattern 601 produced by passage of permanent magnets 106 of rotor 104 over Hall-effect sensor 202c, with the 601 pattern superimposed over the 401 and 501 patterns of FIG. 5. As Hall-effect sensor 202c is positioned at an arc length of 40 degrees from the position of Hall-effect sensor 202b, sinusoidal pattern 501 is phase-shifted by 120 degrees from that of sinusoidal pattern 501. The patterns repeat for each 360 degree rotation of the rotor.

Figure 7:
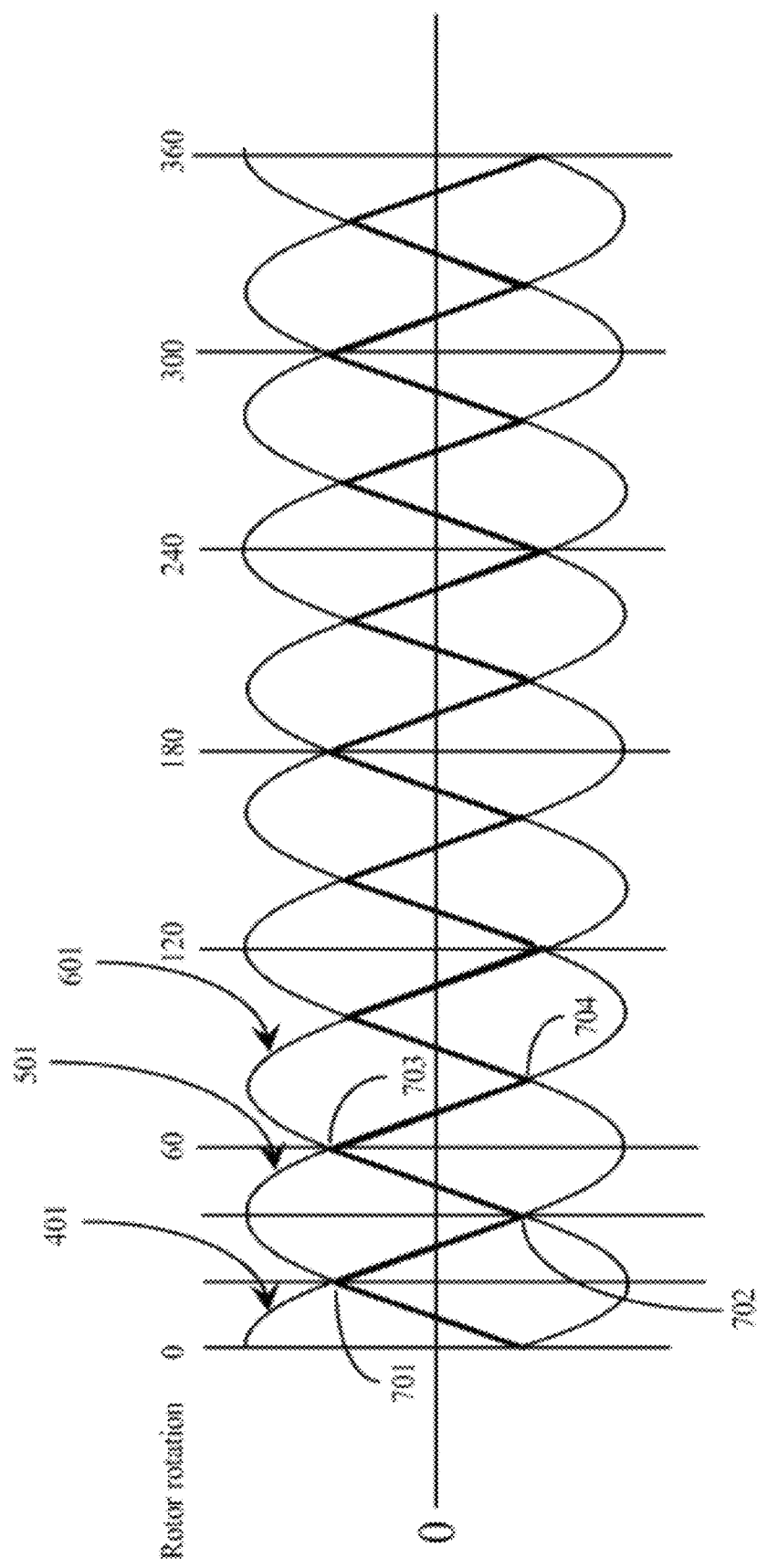
FIG. 7 is a copy of the voltage patterns of FIG. 6 with additional indicia to illustrate a process for using the patterns for encoding a DC motor in a very precise and granular manner.

FIG. 7 is a copy of the voltage patterns of FIG. 6 with additional indicia to illustrate a process for using the patterns for encoding motor 100 in a very precise and granular manner. The three voltage patterns 401, 501 and 601 each have substantially the same max and min peaks, as the Hall-effect sensors are identical, and are sensing the same magnetic fringe fields at the same distances. Moreover, patterns 401, 501 and 601 intersect at multiple points, points 701, 702, 703 and 704 being examples. Notably, the pattern segments between intersection points are substantially straight lines, and these straight line segments have been emphasized in FIG. 7, and may be seen to provide an endless, continuing sequence of connected straight-line segments. Further, zero-crossing points for each straight line segment, and max and min peaks for each pattern may be sensed and recorded.

Figure 8:
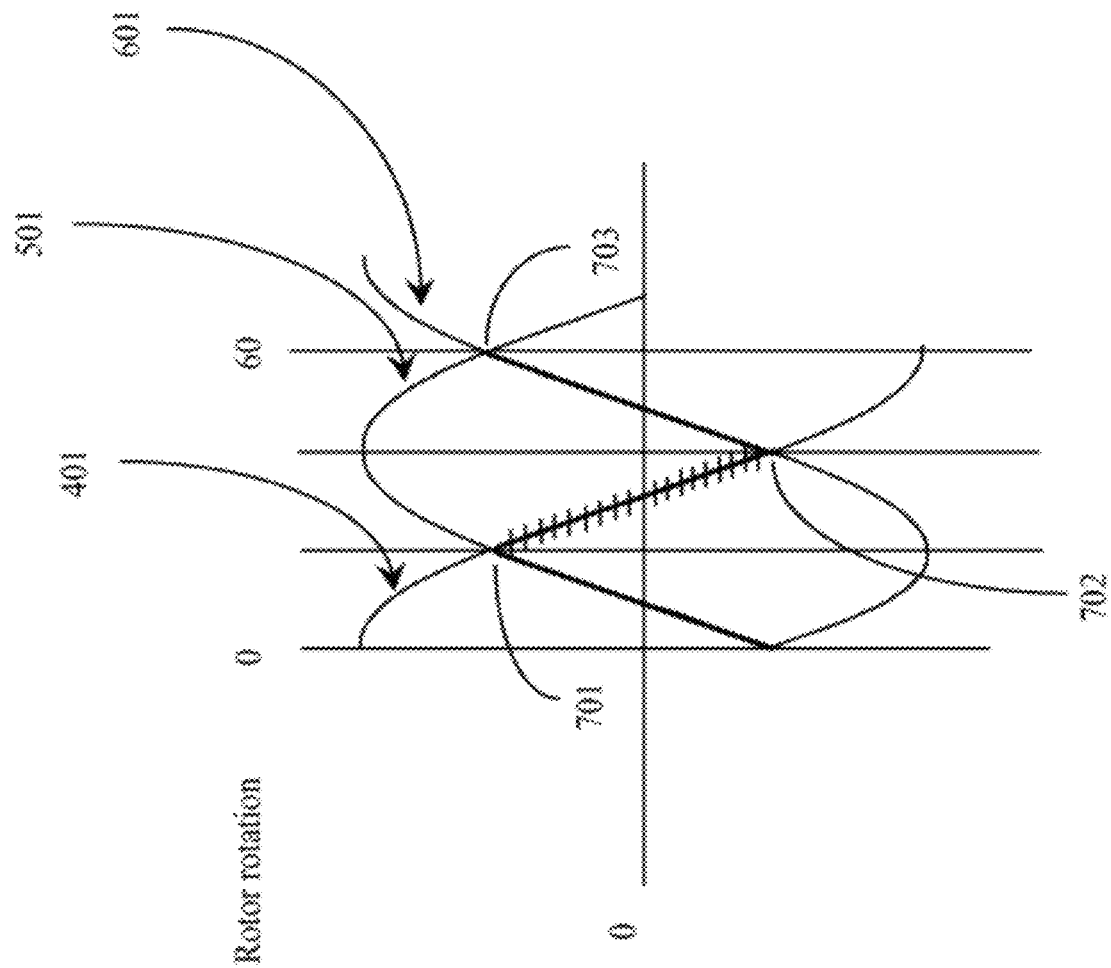
FIG. 8 illustrates straight line segments between crossing points of FIG. 7 for use in determining displacement in an exemplary embodiment of the invention.

FIG. 8 illustrates the two straight line segments between crossing points 701, 702 and 703 of FIG. 7. As a non-limiting example, the segment between crossing points 701 and 702 is shown divided into 20 equal-length segments, which may conveniently be done by sensing the voltage at crossing points 701 and 702, and simple division. Because the physical rotation of the rotor from one pattern intersection to another is twenty degrees of motor rotation, each voltage change by the calculated amount then represents 20/20, that is, 1.00 degrees of rotation of the rotor. This is but one example to illustrate the method. In some embodiments of the invention, circuitry on PCB 201 senses the crossing points and divides by an 11-bit analog to digital converter (ADC) between the intersections, which provides 2048 counts. In this implementation, the mechanical rotational translation of rotor 205 for each count is about 0.0098 degree. Resolution of the system can be increased (or decreased) by using an ADC with a higher (or lower) bit resolution. For example, using an 8-bit ADC would resolve each count to about 0.078 degrees, a 16-bit ADC would resolve each count to 0.00031 degrees, and using a 20-bit ADC would resolve each count to about 0.00002 degrees. Alternatively, increasing or decreasing the number of poles will correspondingly increase or decrease the resolution of the system.

In some embodiments, the approaches described herein provide for a high degree of accuracy and precision for mechanisms driven by motor 100. In the non-limiting example described above using an 11-bit ADC, the motor position can be controlled to 0.0005 degree mechanical. Coupled with gear reduction extremely fine control of translation and rotation of mechanisms can be attained. In some embodiments, motor 100 is coupled to a translation drive for a syringe-pump unit to take in and expel fluid in analytical chemical processes.

Figure 9:
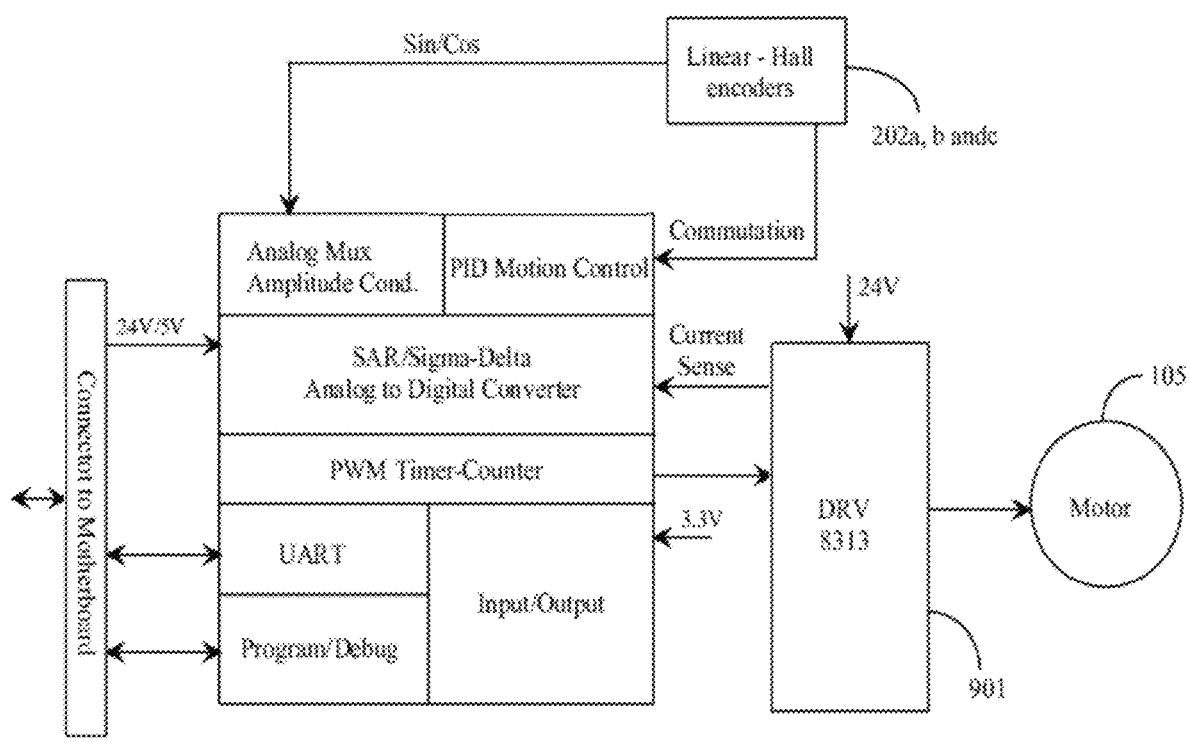
FIG. 9 is a diagram depicting circuitry in an exemplary embodiment of the invention for controlling a DC motor using output of the Hall-effect sensors.

FIG. 9 is a diagram depicting circuitry in one embodiment of the invention for controlling motor 100 using the output of the Hall-effect sensors and the unique method of analyzing only the linear portions of phase-separated curves produced by the sensors, the linear portions divided into equal segments divided as described above. Output of the Hall-effect sensors 202a, 202b is provided to a proportional-integral-derivative (PID) motion control circuitry for commutation purpose, and the waveforms produced by interaction of the rotor magnets with the Hall-effect sensors is provided to multiplexer circuitry as shown in FIG. 9. In some embodiments, displacement of the motor can be controlled based on linear portions (e.g. zig zag) obtained from two or more sinusoidal curves of the voltage measured by two or more sensors of the motor.

Figure 10:
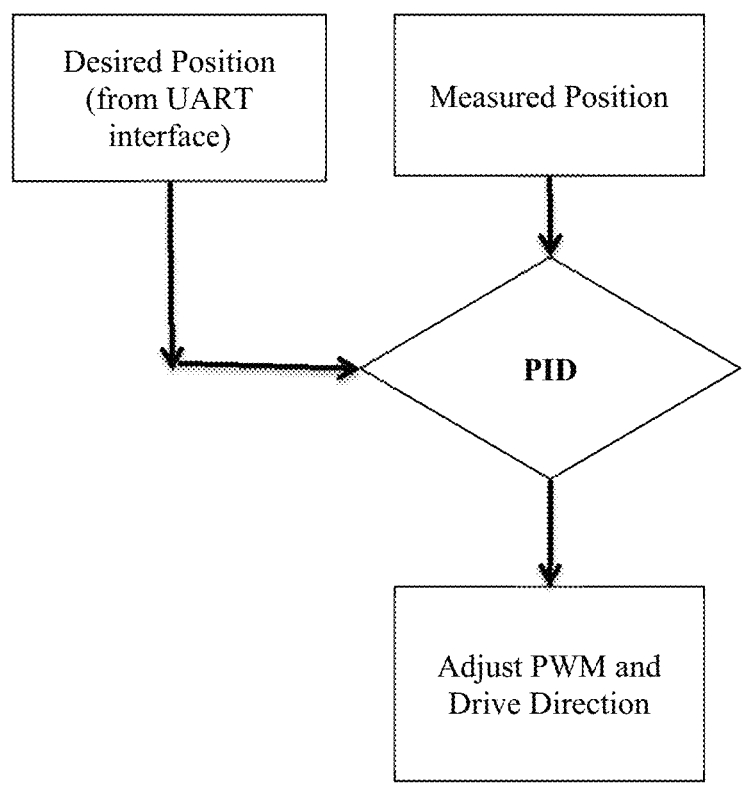
FIG. 10 is a control schematic using PID control to control PWM and drive direction of a motor mechanism.

FIG. 10 is a control schematic depicting control over adjusting a Pulse-width-modulation (PWM) and drive direction of a motor by use of a PID controller. The PID controller includes inputs of a desire position of the motor displacement as well as the measured position. While in conventional devices, the measured encoder position is provided by a hardware encoder or position-based sensor, in some embodiments, this input can be provided by the linear portions of the measured voltages from the analog sensors without requiring use of any hardware sensor or position-based sensor. Thus, the approach described herein allows for determination of an input that is conventionally provided by a hardware encoder, without otherwise altering the control configuration. It is appreciated, however, that a processing unit would be adapted to determine the encoder position input.

Figure 11:
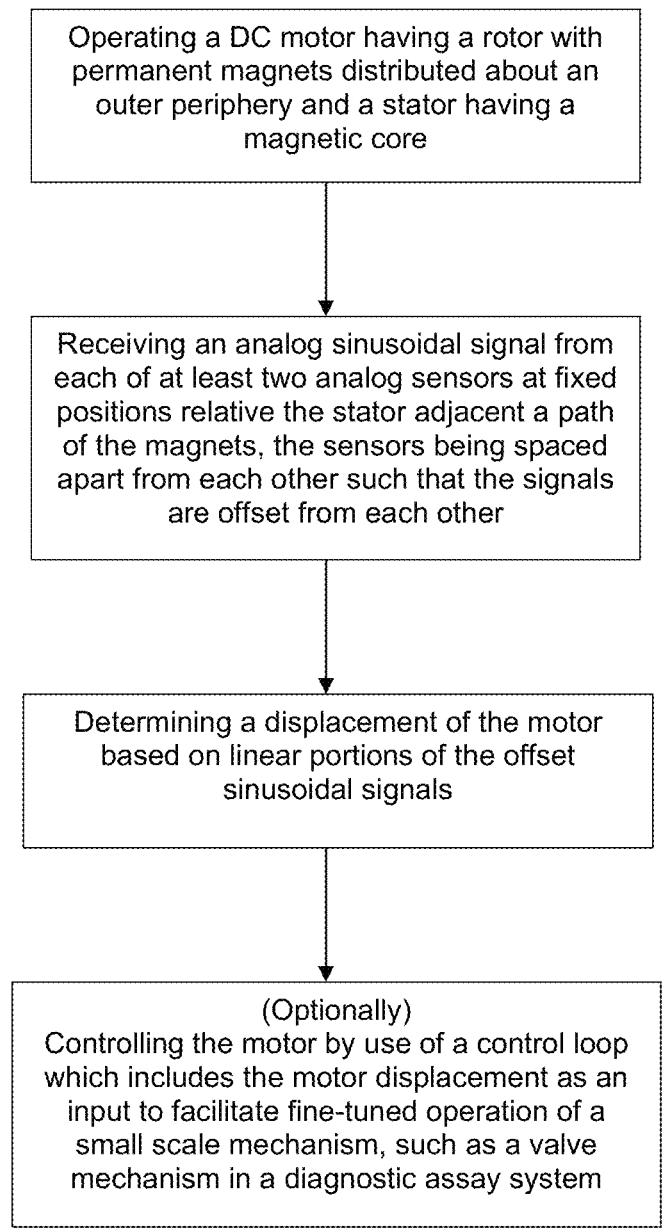
FIG. 11 illustrates a method of determining displacement of a motor during operation in accordance with some embodiments of the invention.

FIG. 11 illustrates a method in accordance with some embodiments. The method includes: Operating a DC motor having a rotor with permanent magnets distributed about an outer periphery and a stator having a magnetic core. During operation of the motor, the system receives an analog sinusoidal signal from each of at least two analog sensors in a fixed position relative the stator, the sensors being spaced apart from each other such that the sinusoidal signals are offset from each other. The system can include multiple analog sensors, such as Hall-effect sensors, distributed uniformly along at least a portion of the motor's rotational path. In some embodiments, such a configuration includes at least three such sensors separated by about 40 degrees from each other, as shown in FIG. 3A. The system then determines a displacement of the motor based on linear portions of the offset sinusoidal signals. The displacement of the motor can be used by the system to inform various other processes or functions of the system, or can be used to control the motor by use of a control loop which includes the motor displacement as an input to a controller, such as a PID controller. In some aspects, this approach can be used to facilitate or fine-tune operation of a small scale valve mechanism or a syringe drive mechanism in a diagnostic assay system or other such fluid processing system.

As described above in the non-limiting exemplary embodiments, an ADC is used to produce the division of the straight portions of the phase-separated waveforms and motor 100, which can be driven by, for example, a DRV8313 Texas Instruments motor driver circuit. It is understood that there are other arrangements of circuitry that might be used while still falling within the scope of this approach. In some embodiments the circuitry and coded instructions for sensing the Hall-effect sensors and providing motor encoding may be implemented in a programmable system on a chip (PSOC) on the PCB.

It is appreciated that a variety of alterations can be made in the embodiments described herein without departing from the scope of the invention. For example, electric motors of different designs might be incorporated and controlled in alternative embodiments of the invention by placement of sensors to generate substantially sinusoidal phase-separated waveforms in a manner that the circuitry takes into account only the substantially straight portions of the resulting, intersecting curves, with additional resolution provided by dividing the straight portions into equal length segments, effectively dividing the voltage increments into equal known segments to be associated with fractions of rotor or stator rotation, depending on mechanical design of the motor.

Some non-limiting exemplary uses and applications for a DC electric motor according to the invention include the following:

Diagnostic applications: With increasing use of robotics for use in high-throughput processing of fluid samples and performing of diagnostic assays, high resolution control of mechanical mechanisms has become extremely useful. Particularly, as diagnostic devices have trended toward small-scale and microdevices, which are more efficient and require smaller sample sizes, control over small-scale movements is of particular interest.

Medical applications: With increasing use of robotics for remote surgery techniques, extremely well controlled movement of remotely controlled implements have become essential. For example, in ophthalmology or neurology procedures where manipulation of retinal cells or nerve endings require movements with microscopic resolution. In order to effect these movements, which are far finer than is possible with a human hand with eye coordination, computers are used to move actuators in concert with feedback from suitable sensors. A motor with high resolution positional encoding capabilities as disclosed herein can assist the computer, and therefore the surgeon, in performing these delicate procedures.

Semiconductor fabrication: Systems for fabrication of semiconductor devices rely on fine movement of the silicon wafer and manipulator arms. These movements are regulated by means of positional feedback. A motor with high resolution positional encoding capabilities as disclosed herein suitable in these applications.

Aerospace and satellite telemetry: High resolution angular position feedback can be used for precise targeting and for antenna positioning. In particular, satellite communication antenna dishes need to precisely track orbiting satellites. Satellite trajectory combined with precise angle feedback from a motor as described herein mounted to the antenna and power spectrum from the antenna can assist precise tracking. In addition, because the motor as described herein is small, inexpensive and robust, it is an ideal choice for use on satellites and in other extra-terrestrial applications that will be well known to persons of skill in the art.

Remote controlled vehicles: the small size and reduced cost of the motor disclosed herein makes it desirable for use in remote controlled vehicle applications, including drones. In particular the high resolution positional encoding features of the motor make it ideal for steering (directional control) and acceleration (power control) in both commercial and recreational uses of remote controlled vehicles. Additional uses will be apparent to persons of ordinary skill in the art.

Further to the above, the skilled person will be aware that there are a variety of ways that circuitry may be arranged to provide granular control for a motor thusly equipped and sensed. The invention is limited only by the claims that follow.

The invention claimed is:

1. A DC electric motor comprising:
  a stator mounted to a substrate, the stator comprising a coil assembly having a core of magnetic material and electrical windings, the coil assembly having an outside diameter, a proximal extremity, and a distal extremity;
  a rotor mounted to the stator, the rotor comprising permanent magnets mounted to a cylindrical skirt and each extending to a distal edge, the rotor having an outside diameter, an inside diameter, wherein the distal edges of the permanent magnets extend beyond the coil assembly in a vertical direction when the rotor is oriented horizontally; and
  a plurality of sensors mounted to the substrate adjacent the distal edges of the permanent magnets along the vertical direction when the rotor is oriented horizontally, wherein a displacement of the motor is determinable from a signal from a sensor of the plurality of sensors;
  wherein a clearance between the extended distal edge of each of the permanent magnets and the plurality of sensors is defined such that during operation of the motor when the rotor is oriented horizontally, passage of the permanent magnets over the plurality of sensors produces a plurality of intersecting substantially sinusoidal signals of varying voltage;
  a processor module communicatively coupled with the plurality of sensors and configured to:
    receive the plurality of voltage signals from the plurality of sensors during rotation of the rotor, each signal having a linear portion corresponding to a straight line segment between crossing points; and
    determine a displacement of the motor from only the linear portion of the sinusoidal signal from a respective sensor of the plurality of sensors.

2. The motor of claim 1, wherein the plurality of sensors mounted to the substrate are positioned relative the extended distal edges of the permanent magnets, with the clearance from the extended distal edges of the permanent magnets to the plurality of sensors sufficient to provide a voltage of from about 2 to about 5 volts DC.

3. The motor of claim 2, wherein the extended edge of the permanent magnets extend beyond the distal extremity of the coil assembly by about 1 mm or more.

4. The motor of claim 1, wherein the plurality of sensors are linear Hall-effect sensors, spaced apart by a common arc length along an arcuate path of the rotor.

5. The motor of claim 4, comprising an even number of permanent magnets evenly spaced around the cylindrical skirt with adjacent magnets exhibiting opposite polarity at the distal edge of the skirt, and three Hall-effect sensors, each Hall-effect sensor producing a voltage varying in a substantially sinusoidal pattern, the three patterns phase-shifted by about 120 degrees when the motor is in operation.

6. The motor of claim 5, comprising twelve magnets and three linear Hall-effect sensors spaced at increments of forty degrees of mechanical rotation.

7. The motor of claim 5, wherein intersections of adjacent sinusoidal patterns define linear portions of the patterns.

8. The motor of claim 6, wherein the substrate is a printed circuit board (PCB) comprising circuitry enabling analog-to-digital conversion (ADC) of voltage values in the defined linear portions of the patterns, and zero-crossing detection of the analog voltage patterns in the defined linear portions of the patterns, the processor module being configured to perform ADC of voltage values in the defined linear portions and zero-crossing detection of the analog voltage patterns.

9. The motor of claim 8, wherein the circuitry employs an 11-bit analog to digital converter (ADC), producing 2048 equally-spaced digital values for each linear portion of the patterns that represent a resolution of the system.

10. The motor of claim 8, wherein the circuitry is implemented in a programmable system on a chip (PSOC).

11. A method for encoding a DC electric motor, comprising:
mounting a stator to a substrate, the stator comprising a coil assembly having a core of magnetic material and electrical windings, the coil assembly having an outside diameter, a proximal extremity, and a distal extremity;
mounting a rotor to the stator, the rotor comprising permanent magnets mounted to a cylindrical skirt, each permanent magnet extending to a distal edge, the rotor having an outside diameter, an inside diameter, wherein the distal edges of the permanent magnets extend beyond the coil assembly in a vertical direction when the rotor is oriented horizontally;
positioning a plurality of sensors on the substrate adjacent the distal edges of the permanent magnets along the vertical direction when the rotor is oriented to rotate along a horizontal plane, wherein a displacement of the motor is determinable from a signal from a sensor of the plurality of sensors;
operating the DC electric motor by commutation, causing the permanent magnets to pass over the plurality of sensors when the rotor is oriented horizontally, producing a plurality of intersecting sinusoidal patterns of varying voltage each pattern having a linear portion corresponding to a straight line segment between crossing points; and
determining positions of the rotor from only the linear portion of the sinusoidal pattern of a respective sensor of the plurality of sensors.

12. The method of claim 11, wherein the plurality of sensors mounted to the substrate are positioned relative the extended edge of the permanent magnets of the rotor, with a clearance from the extended edge to the plurality of sensors sufficient to provide a voltage of from about 2 to about 5 volts DC.

13. The method of claim 12, wherein the extended edge of the permanent magnets extend beyond the distal extremity of the coil assembly by about 1 mm or more.

14. The method of claim 11, wherein the plurality of sensors are linear Hall-effect sensors, spaced apart by a common arc length along an arcuate path of the rotor.

15. The method of claim 14, comprising an even number of permanent magnets evenly spaced around the cylindrical skirt with adjacent magnets exhibiting opposite polarity at the distal edge of the skirt, and three Hall-effect sensors, each Hall-effect sensor producing a voltage signal varying in a substantially sinusoidal pattern, the three patterns phase-shifted by about 120 degrees.

16. The method of claim 15, comprising twelve magnets and three linear Hall-effect sensors spaced at increments of about twenty degrees of mechanical rotation.

17. The method of claim 15, wherein intersections of adjacent sinusoidal patterns define linear portions of the patterns.

18. The method of claim 16, wherein the substrate is a printed circuit board (PCB) comprising circuitry enabling analog-to-digital conversion (ADC) of voltage values in the defined linear portions of the patterns, and zero-crossing detection of the analog voltage patterns.

19. The method of claim 18, wherein the circuitry employs an 11-bit analog to digital converter, producing 2048 equally-spaced digital values for each linear portion of the patterns.

20. The method of claim 18, wherein the circuitry is implemented in a programmable system on a chip (PSOC).

21. A motor system comprising:
a stator comprising a magnetic core;
a rotor that is rotatably mounted relative to the stator, the rotor having a plurality of permanent magnets distributed radially about the rotor and each extending to a distal edge that extends beyond the magnetic core in a vertical direction when the rotor is oriented horizontally;
a plurality of sensors at fixed positions relative the stator and disposed adjacent a path of the plurality of magnets in a vertical direction during rotation of the rotor when the rotor is oriented to rotate along a horizontal plane, wherein the plurality of magnets extend a distance beyond the magnetic core of the rotor and a clearance between the distal edges of the plurality of permanent magnets and each of the plurality of sensors is defined such that during operation of the motor, passage of the permanent magnets over the plurality of sensors produces a plurality of intersecting substantially sinusoidal signals of varying voltage such that a displacement of the motor is determinable from a signal from a sensor of the plurality of sensors; and
a processor module communicatively coupled with the plurality of sensors and configured to:
receive the plurality of measured voltage signals from the plurality of sensors during rotation of the rotor, each signal having a linear portion corresponding to a straight line segment between crossing points, and
determine a displacement of the motor from only the linear portion of the sinusoidal signal from a respective sensor of the plurality of sensors.

22. The system of claim 21 wherein the plurality of sensors includes at least two sensors distributed along a path of the plurality of magnets such that the linear portions of the sinusoidal signals from adjacent sensors of the at least two sensors intersect so as to provide increased resolution and granularity of the combined linear portions of the signals for determination of motor displacement.

23. The system of claim 21, further comprising a small-scale mechanism, wherein the motor is configured for fine-tuned operation of the small-scale mechanism, the motor having a resolution of about 0.1 degrees of mechanical rotation or less.

24. The system of claim 21, further comprising a diagnostic assay system having a syringe drive and/or valve assembly.

25. The system of claim 24, wherein the motor system is configured for operation of the syringe drive to effect precise fluid metering and/or configured for operation of the valve assembly to facilitate complex sample processing upon fine-tuned movement of the valve assembly.

* * * * *